(12) United States Patent
Tran et al.

(10) Patent No.: US 10,902,082 B2
(45) Date of Patent: Jan. 26, 2021

(54) CACHING METHOD AND SYSTEM FOR LARGE OBJECTS ON A CORPORATE NETWORK USING A SEMANTIC UNDERSTANDING OF THE OBJECTS AND SOCIAL INFORMATION

(71) Applicant: International Business Machines Corporation, Armonk, NY (US)

(72) Inventors: Khoi-Nguyen Dao Tran, Southbank (AU); Simon Harris, Melbourne (AU); Mukesh Kumar Mohania, Forrest (AU)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/146,620

(22) Filed: Sep. 28, 2018

(65) Prior Publication Data
US 2020/0104424 A1    Apr. 2, 2020

(51) Int. Cl.
| G06F 15/173 | (2006.01) |
| G06F 16/957 | (2019.01) |
| H04L 29/08 | (2006.01) |
| H04L 12/26 | (2006.01) |
| G06F 40/30 | (2020.01) |
| G06Q 50/00 | (2012.01) |

(52) U.S. Cl.
CPC .......... *G06F 16/9574* (2019.01); *G06F 40/30* (2020.01); *H04L 43/16* (2013.01); *H04L 67/02* (2013.01); *H04L 67/2842* (2013.01); *G06Q 50/01* (2013.01)

(58) Field of Classification Search
CPC ..... G06F 16/9574; G06F 40/30; H04L 43/16; H04L 67/02; H04L 67/2842; G06Q 50/01
USPC .......... 709/204, 223, 224, 225, 226
See application file for complete search history.

(56) References Cited

U.S. PATENT DOCUMENTS

| 9,037,700 B2* | 5/2015 | Agrawal | ................ G06Q 50/01 709/224 |
| 2003/0033448 A1* | 2/2003 | Kieffer | ...................... G06F 8/71 719/331 |
| 2006/0143668 A1* | 6/2006 | Du Breuil | .......... H04N 7/17318 725/89 |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Liang Che A Wang
(74) *Attorney, Agent, or Firm* — Joseph Petrokaitis, Esq.; McGinn IP Law Group, PLLC

(57) ABSTRACT

A caching method, system, and computer program product include compiling a combined action of a social interaction with a sharing of an object via a Uniform Resource Locator (URL) in real-time and from an offline database, extracting semantic information from the combined action, describing the semantic information of the combined action as an embedding of the object in a general object vector space, and creating a caching policy for access to the object based on a prediction of an access time derived from the general object vector space and the description of the combined action.

13 Claims, 5 Drawing Sheets

(56) References Cited

U.S. PATENT DOCUMENTS

| | | | | |
|---|---|---|---|---|
| 2009/0276488 A1* | 11/2009 | Alstad | ............... | H04L 67/303 |
| | | | | 709/203 |
| 2014/0074927 A1* | 3/2014 | Rodriguez | .......... | G06F 16/9574 |
| | | | | 709/204 |
| 2014/0250086 A1* | 9/2014 | Shi | ................ | H04L 63/0442 |
| | | | | 707/692 |
| 2015/0163320 A1* | 6/2015 | Hu | ................ | H04L 67/2852 |
| | | | | 709/214 |
| 2017/0019495 A1* | 1/2017 | Bennis | ............. | H04L 67/2842 |
| 2020/0059531 A1* | 2/2020 | Coster | ............. | H04L 67/2847 |

OTHER PUBLICATIONS

Bastug, et al. "Social and Spatial Proactive Coaching for Mobile Data Offloading" ICC'14-W3: Workshop on Small Call and 5G Networks; Centre for Wireless Communications, IEEE, University of Oulu, Finland, 2014.

Cheng, et al. "Using Database Technology to Improve Performance of Web Proxy Servers" Web'2001, 2001 ACM SIGMOD Workshop on the Web and Databases, Santa Barbara, CA.

Ma, et al. "Socially Aware Caching Strategy in Device-to-Device Communication Networks", IEEE Transactions on Vehicular Technology, vol. 67. No. 5, May 2018.

Nikolaou, et al. "Proactive Cache Placement on Cooperative Client Caches for Online Social Networks" IEEE Transactions on Parallel and Distribution Systems, vol. 27, No. 4. Apr. 2016.

* cited by examiner

CACHING METHOD AND SYSTEM FOR LARGE OBJECTS ON A CORPORATE NETWORK USING A SEMANTIC UNDERSTANDING OF THE OBJECTS AND SOCIAL INFORMATION

BACKGROUND

The present invention relates generally to a caching method, and more particularly, but not by way of limitation, to a system, method, and computer program product which combines caching of large objects locally in a corporate environment for recommending caching policies for large objects based on their access by employees and the employees' profile and their social interactions on a corporate network.

Conventionally, caching large data objects (e.g. video, data, sound, etc.) primarily focuses on improving where the object is best stored physically on a network. Determining optimal storage locations rely on the object's access patterns on the network and do not make use of information about who is accessing that file and their social interactions on a corporate network.

Large objects come from a variety sources (e.g., web videos from media or direct download websites, or files on cloud storage on the web or internally within corporate networks). These large objects are difficult for caching because of trade-offs with infrequent and ad-hoc access versus size and longevity.

Conventional approaches focus mostly on server side caching to keep a file in memory and avoid reading the file from disk, or across the network. This type of caching is well established and understood and is used by file system caches, network caches, web caches, database caches, etc.

SUMMARY

In an exemplary embodiment, the present invention provides a computer-implemented caching method, the method including compiling a combined action of a social interaction with a sharing of objects via Uniform Resource Locator (URL) in real-time and from an offline database, extracting semantic information from the combined action, describing the semantic information of the combined action as an embedding of the object in a general object vector space, and creating a caching policy for access to the objects based on a prediction of an access time derived from the general object vector space and the description of the combined action. One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
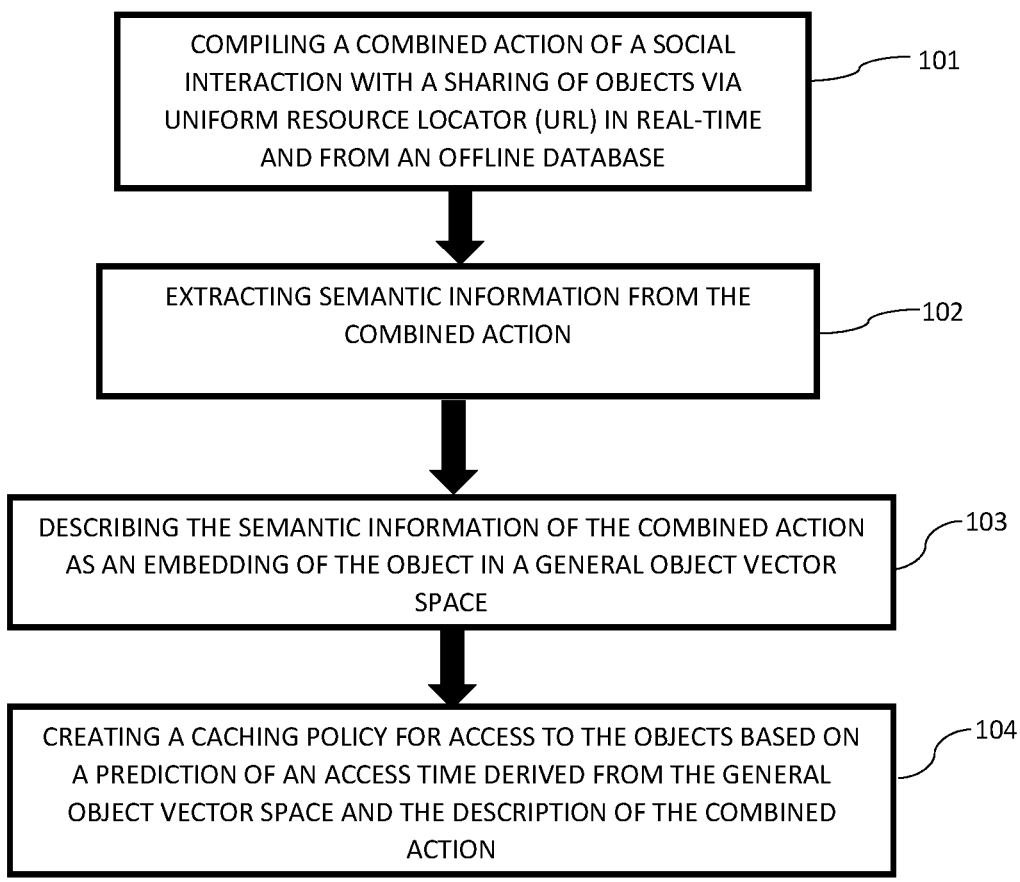
FIG. 1 exemplarily shows a high-level flow chart for a caching method 100 according to an embodiment of the present invention.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity.

By way of introduction of the example depicted in FIG. 1, an embodiment of a caching method 100 according to the present invention can include various steps for predicting who is likely to access large files in a database using contextual and social information, and for recommending caching policies that reduce cache misses, thereby leading to a better user experience.

Thus, the invention can combine caching of large objects locally in a corporate environment. The policy used to determine when files are evicted from the cache can be determined by social information of the employees.

Figure 3:
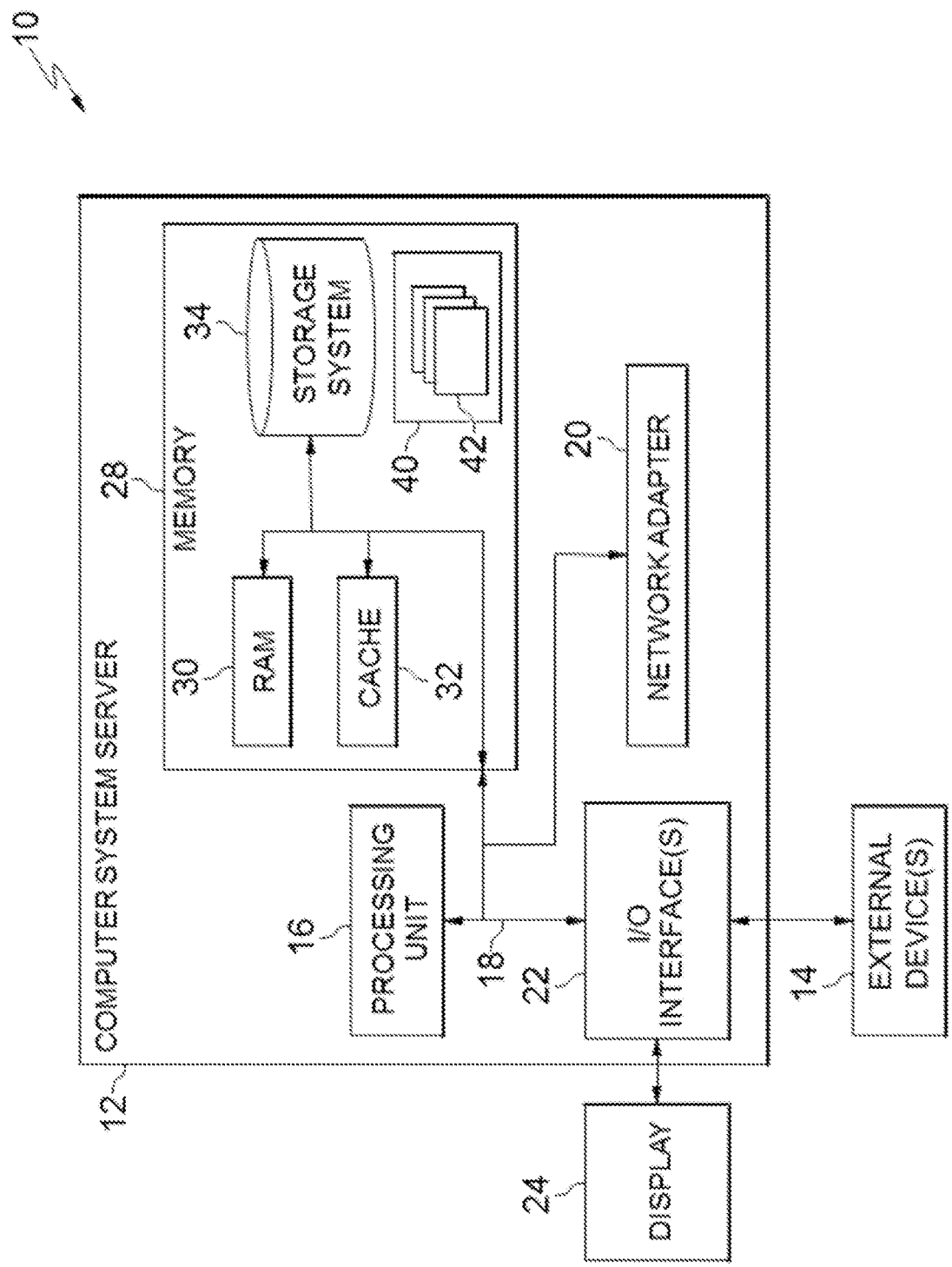
FIG. 3 depicts a cloud-computing node 10 according to an embodiment of the present invention.

By way of introduction of the example depicted in FIG. 3, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 5), it is nonetheless understood that the present invention can be implemented outside of the cloud environment.

Figure 2:
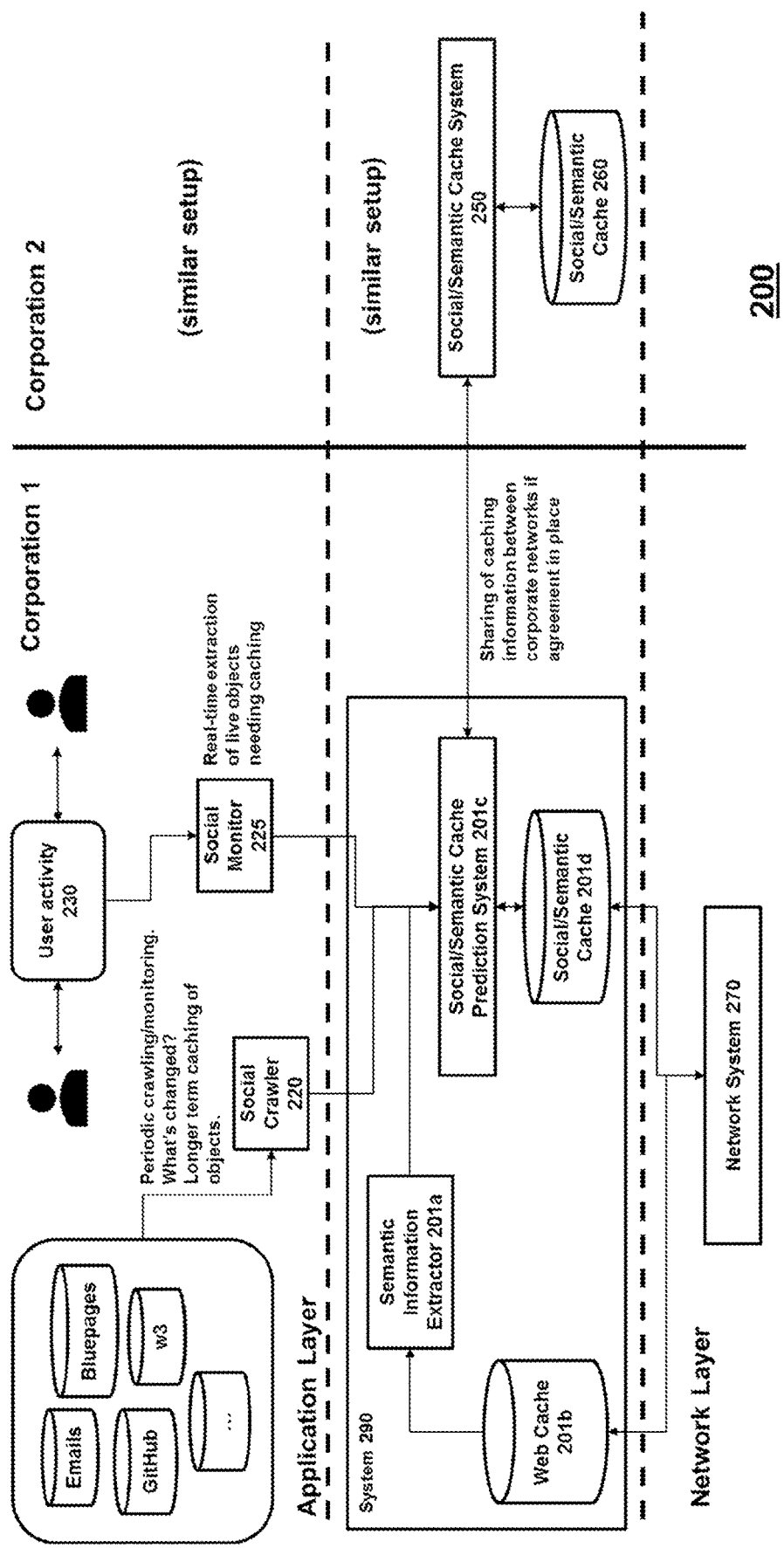
FIG. 2 exemplarily depicts a system architecture 200 for the method 100 according to an embodiment of the present invention.

Referring to FIGS. 1 and 2, the method 100 and system architecture 200 combine the semantic understanding of objects (e.g. for video and images: extract objects, scenery, people, descriptions, tags, etc.) and social profiling of a user (e.g. large files accessed, files downloaded, access times, organization profile, interactions with colleagues, etc.) to create better caching policies for large objects.

That is, FIGS. 1 and 2 depict a caching system that sits in between the application layer and the network layer with four main components including a social monitor 225, a social crawler 220, a semantic information extractor 201a, and a caching predictor 201c/201d. The social monitor 225 keeps watch of employees' social interactions (e.g. Slack™, SameTime™) and access and sharing of objects via Uniform Resource Locators (URLs). The social crawler 220 searches databases for social interactions and sharing of large objects (e.g. e-mail, github, w3, wikis, forums, etc.). The semantic information extractor 201a uses machine learning to extract semantic information from objects and maps them on a vector space that allows comparison of objects. Therefore, a caching system 200 is disclosed that combines the semantic understanding of large objects with the social interaction of employees on a corporate network (or across different corporations i.e., corporation 1 and corporation 2), to create caching policies that are predictive of employees' access to large objects.

Thus, using semantic information extracted and stored in the social/semantic cache system 201c from objects and employee's social information (e.g., messages between employees) to improve the caching of large objects on corporate networks. Caching traditionally has focused on the network layer and optimal storage of file fragments based on network access. The architecture 200 can provide a better understanding of large objects and how they are shared by employees to create better predictive caching policies, optimizing network usage, and employee satisfaction of using their corporate network.

The social monitor 225 can monitor data sources of interaction between two employees such as instant messaging, web browsing, e-mail, etc. Also, the social monitor 225 monitors how employees share and download large data objects (via URLs). For example, a first employee may download a lecture from a website and want a second employee to watch the same lecture. The first employee can send an e-mail to the second employee with a link to the lecture stating that they should watch the lecture. The social monitor 225 keeps track of how the objects are shared between employees and which employees downloaded the files. In general, the social monitor 225 performs a real-time extraction of live objects that need caching by monitoring user activity 230 at an application layer. That is, the social monitor 225 keeps track of a combined action of sharing an object with the social interaction associated with sharing the object (e.g., a message 'please watch this video file').

The social crawler 220 crawls offline databases for data sources such as e-mail, github, w3, wikis, forums, corporate profile, etc. The social crawler compiles a combined action of a sharing of links to large objects with a social interaction. The social crawler 220 collects data similar to the social monitor 225 at the application layer.

The social monitor 225 and social crawler 220 store the combined action in the social/semantic cache 201d. This is accessible by other users via the network system 270 at a network layer. That is, the web cache 201b and the semantic information extractor 201a interface with the network system 270 (e.g., download/share objects) as well as the social/semantic cache 201d which stores the caching policies.

It is noted that the social monitor 225 and the social crawler 220 monitor, for example, communications between employees across a work network when the communication includes an object sent with the communication. In other words, a first employee can send a link of a tutorial video to a second employee with a message 'watch this video' or the like and these types of messages are found and categorized.

The semantic information extractor 201a extracts semantic information from the combined action (e.g., sharing an object and the social interaction to share the object). The semantic information extractor 201a extracts the semantic information from the web cache 201b which stores the combined actions. That is, objects downloaded by employees or shared are collected from the web cache 201b. Semantic content is extracted from these large data objects using machine learning or an embedding projection. The end result is tags describing the object and an embedding of the object in a general object vector space, where both allows the system 290 to do prediction/recommendation.

It is noted that the combined action includes when a social interaction is sent with an object associated with the social interaction such as 'watch this video' or the like with the object link to the video embedded in the communication.

The caching predictor system 201c, based on social and semantic components above and historical caching statistics collected for other large objects (e.g. number of access, types of files, distribution of fragments, cache hits and misses, length of storage), creates a caching policy for the object of the combined action. For example, a social collaborative filtering algorithm can be used to predict large file objects that other employees will also access based on their profile and network information from the network layer 270. And, the prediction system 201c realizes the caching policies of objects to physical locations of objects on the network. The caching policy is stored in the social/semantic cache 201d. The prediction system 201c also connects and coordinates with other caching predictor systems deployment on the same network system (internal network) or on another organization's system (external network such as corporation 2).

More specifically, referring to FIG. 1, in step 101, a combined action of a social interaction with a sharing of objects via a Uniform Resource Locator (URL) is compiled in real-time and from an offline database.

In step 102, semantic information is extracted from the combined action. And, in step 103, the semantic information of the combined action is described as an embedding of the object in a general object vector space.

More specifically, semantic information in objects may be extracted in different ways, depending on the type of the object. For example, for images, additional metadata describing the entities and context can be achieved using image-captioning techniques, which can be extended to videos. For documents, entities and relationships may be recognized from the text and contextual meaning can be added to the documents' metadata. For audio clips (e.g. podcasts, music, etc.), speech-to-text can be used to transcribe the audio and the techniques for documents can be applied. For data sets or general data objects, the text data can be used (in a similar way to documents) where available, or for binary objects (e.g. compressed files, serialized data objects), one may use the metadata associated with the object, or a structural regularity analysis of the binary contents of the file to extract potential contextual information.

In step 104, a caching policy is created for access to the objects based on a prediction of an access time derived from the general object vector space and the description of the combined action.

For example, in one embodiment including external long videos (e.g., large object size), a first user (in Australia) is a good friend with his colleague, a second user (in the same office), and a third user (in the US office). They interact and share a lot of links with each other nearly every working day. The first user often downloads large 1+ GB video from the web onto his local system (e.g. seminars or talks) and occasionally shares the video (link only) through internal chat to his colleagues (second and third user). The video file is too large to share (e.g. via email or chat). With the current standard web cache system, these large files are often flushed from the web cache, leaving the second and third user needing to download the video file again.

However, via the method 100 and architecture of the system 290, since the first and second/third users interact often and since the second user often downloads the first user's video links, the cache policy is updated to keep the video file in the web cache a little longer, until the second user sees the link and completes the download, thereby leading to less waiting time and saving internet traffic. For the third user, the invention (deployed) in Australia sends a caching recommendation to the invention (deployed) in the US (e.g., to a second corporation from the first corporation), closest to the third user, to cache this video file before he usually arrives at work and checks messages from the first and second users.

In another embodiment, for internal sharing data files, files are not cached locally in Australia when a parent company is in the United States, even though it is highly probable that many researchers will access such data files. This is unnecessary usage of peak internet traffic, where many savings can be achieved by setting up a caching policy for videos that are distributed globally. The method and system solve this issue by analyzing the content and metadata of the talk and determining it is relevant to employees globally. Furthermore, the invention analyzes replays of talks and employees that access these talks, and recommends these replays of talks to other employees where the files are cached locally.

Essentially, the invention may broadcast to employees in particular locations that certain large files (that are of high interest to them) are cached for a limited time, if they want fast access (i.e., changing the cache policy based on an access time). Extending the example above, projects in a company can include of many people globally, sharing data through programs. The invention monitors the sharing of data on a program and can recommend these files, or pre-emptively cache objects that match employees' profiles at particular locations.

Thereby, the invention can proactively cache data at a location of a user in response to detecting a pattern of access by colleagues of the user, wherein the location of the colleagues is different from the location of the user. That is, the caching policy is specific to a location of the user. Nevertheless, the caching policy can be corporation-wide and not specific to a location (e.g., caching policy to maintain file on U.S. server and Australian server such that users do not need to re-download content and take up bandwidth).

Thus, the invention can reduce network bandwidth usage by monitoring at least two user communications to determine (i.e., predict or judge) if an object (e.g., a file, video, audio, etc.) is going to be downloaded a second time by a second user. Then, the caching policy does not remove the object from the server but instead maintains the object such that the second user does not also need to download the file and use extra bandwidth. Such prediction can be made based on users past behavior and the invention can institute a policy, for example, of always retaining the object as a policy retaining the object if the prediction is above a certain threshold (e.g., 10%) based on a variety of factors including the users past behavior, etc. Thus, the system can learn and base such predictions on such learning.

Although the invention was described in a work related setting, the invention is not limited thereto and can be extended to any network between users sharing an object and a social interaction.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, hut has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
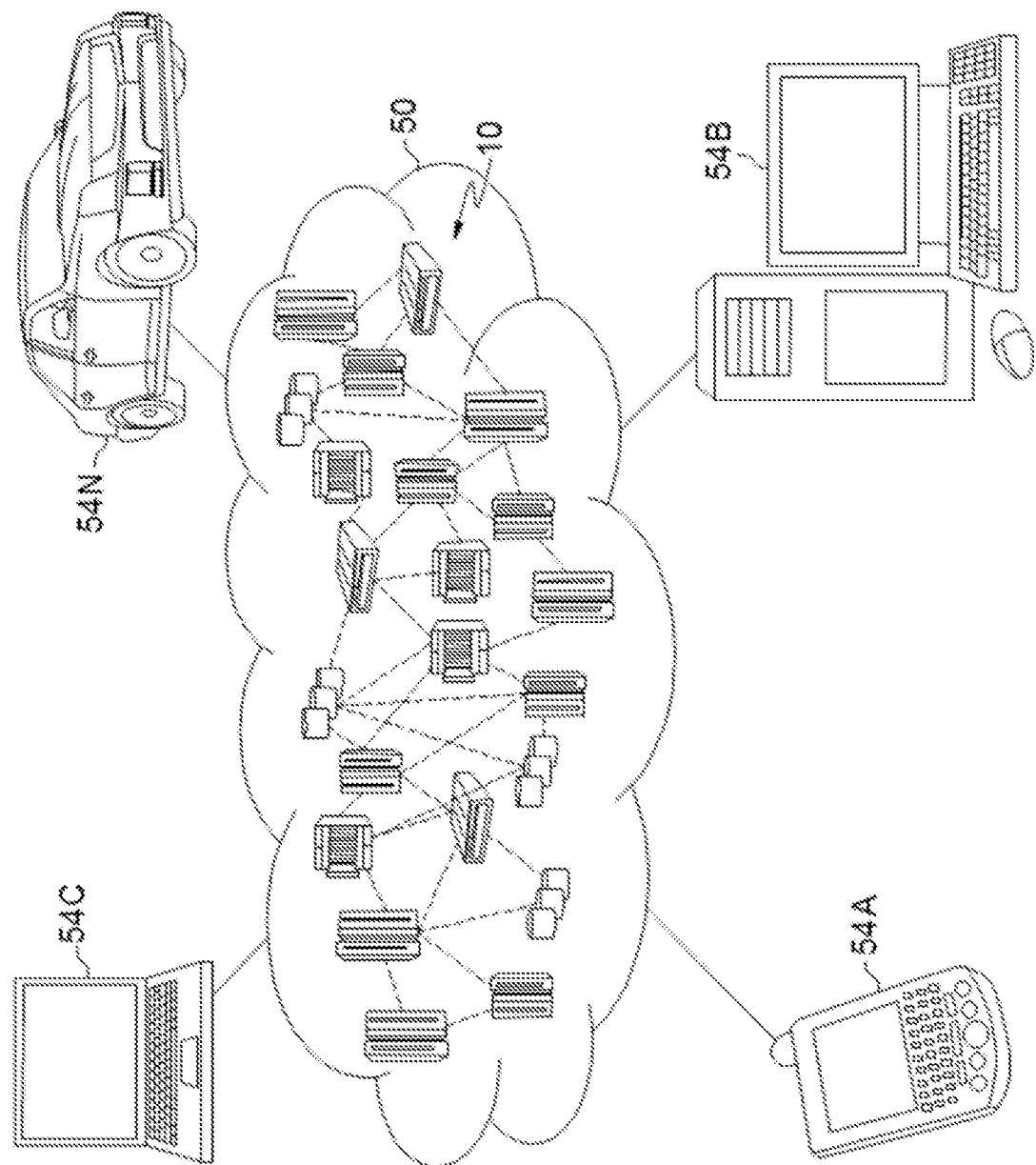
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
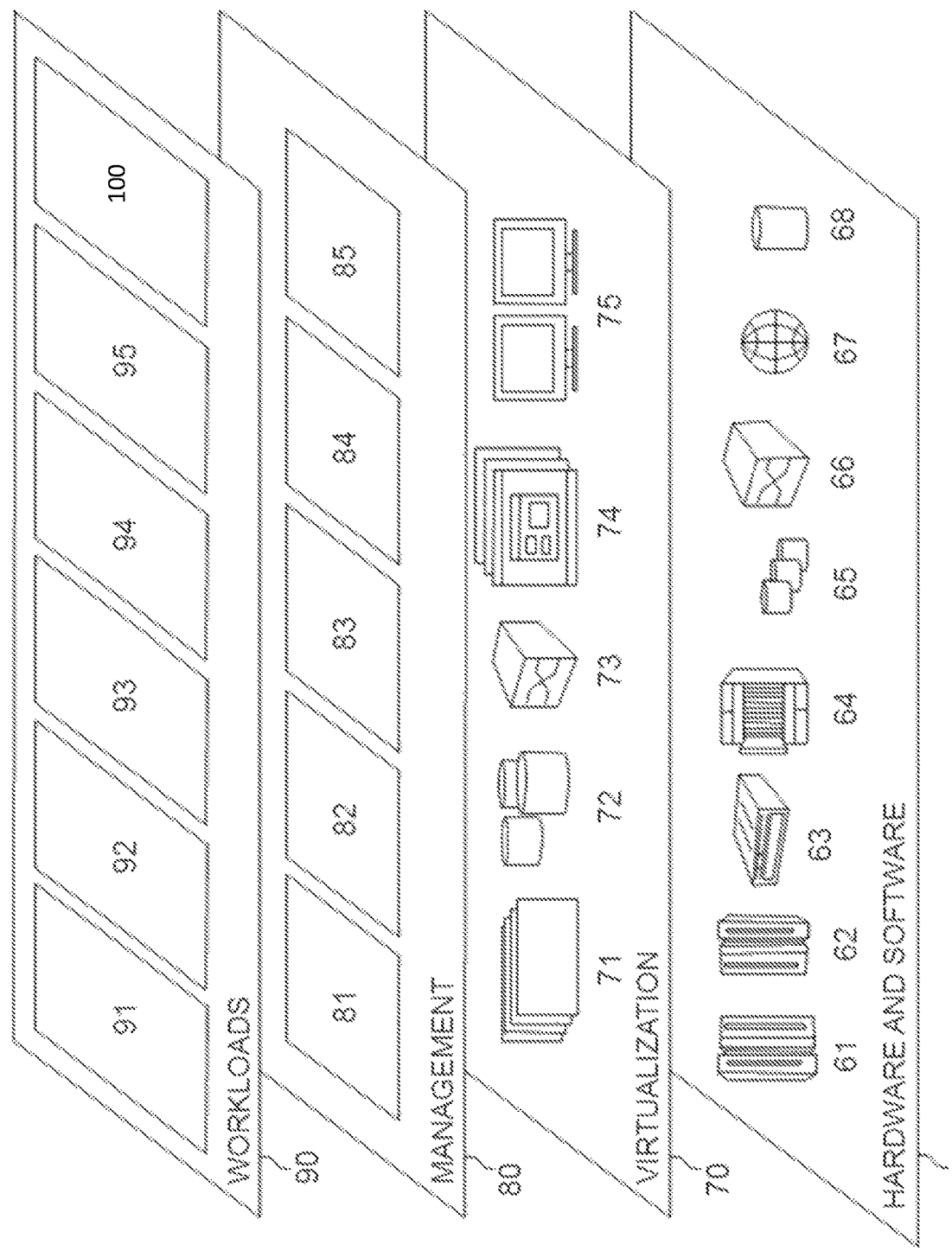
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and caching method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented caching method, the method comprising:
    compiling a combined action of a social interaction with a sharing of an object via a Uniform Resource Locator (URL) in real-time, shared on a same network, and from prior data stored in a database;
    extracting semantic information from the combined action;
    describing the semantic information of the combined action as an embedding of the object in a general object vector space; and
    creating a caching policy for access to the object based on an access time derived from the general object vector space and the description of the combined action, using a social collaborative filtering algorithm to predict a connection in a social network between:
        a first user in a first entity and a second user in the first entity; and
        the first user in the first entity and a third user in a second entity, the second entity having a different caching policy from the first entity,
    wherein the semantic information comprises non-textual information, and
    wherein the caching policy requires only one download of the object.

2. The computer-implemented method of claim 1, wherein communications between the first user and the second user are monitored to compile the combined action when one of the first user and the second user sends a communication with an object to the other of the first user and the second user.

3. The computer-implemented method of claim 1, wherein a plurality of objects are shared between the first user and the second user, and
    wherein the semantic information includes an indication that the second user will view the objects at a time after the first user such that the caching policy saves the objects to a network until the second user has viewed the objects.

4. The computer-implemented method of claim 1, embodied in a cloud-computing environment.

5. The method of claim 1, wherein the caching policy deletes the object unless a connection between the first user and the third user is detected.

6. The method of claim 1, wherein the caching policy saves the object shared by the first user until the second user and the third user access the object.

7. A computer program product for caching, the computer program product comprising a computer-readable storage medium having program instructions embodied therewith, the program instructions executable by a computer to cause the computer to perform:
- compiling a combined action of a social interaction with a sharing of an object via a Uniform Resource Locator (URL) in real-time, shared on a same network, and from prior data stored in a database;
- extracting semantic information from the combined action;
- describing the semantic information of the combined action as an embedding of the object in a general object vector space; and
- creating a caching policy for access to the object based on an access time derived from the general object vector space and the description of the combined action, using a social collaborative filtering algorithm to predict a connection in a social network between:
  - a first user in a first entity and a second user in the first entity; and
  - the first user in the first entity and a third user in a second entity, the second entity having a different caching policy from the first entity,
- wherein the semantic information comprises non-textual information, and
- wherein the caching policy requires only one download of the object.

8. The computer program product of claim 7, wherein communications between the first user and the second user are monitored to compile the combined action when one of the first user and the second user sends a communication with an object to the other of the first user and the second user.

9. The computer program product of claim 7, wherein a plurality of objects are shared between the first user and the second user, and
- wherein the semantic information includes an indication that the second user will view the objects at a time after the first user such that the caching policy saves the objects to a network until the second user has viewed the objects.

10. A caching system, the system comprising:
- a processor; and
- a memory, the memory storing instructions to cause the processor to perform:
  - compiling a combined action of a social interaction with a sharing of an object via a Uniform Resource Locator (URL) in real-time, shared on a same network, and from prior data stored in a database;
  - extracting semantic information from the combined action;
  - describing the semantic information of the combined action as an embedding of the object in a general object vector space; and
  - creating a caching policy for access to the object based on an access time derived from the general object vector space and the description of the combined action, using a social collaborative filtering algorithm to predict a connection in a social network between:
    - a first user in a first entity and a second user in the first entity; and
    - the first user in the first entity and a third user in a second entity, the second entity having a different caching policy from the first entity,
- wherein the semantic information comprises non-textual information, and
- wherein the caching policy requires only one download of the object.

11. The system of claim 10, wherein communications between the first user and the second user are monitored to compile the combined action when one of the first user and the second user sends a communication with an object to the other of the first user and the second user.

12. The system of claim 10, wherein a plurality of objects are shared between the first user and the second user, and
- wherein the semantic information includes an indication that the second user will view the objects at a time after the first user such that the caching policy saves the objects to a network until the second user has viewed the objects.

13. The system of claim 10, embodied in a cloud-computing environment.

* * * * *